(12) United States Patent
Chick

(10) Patent No.: US 7,143,800 B2
(45) Date of Patent: *Dec. 5, 2006

(54) NON-AUTOCLAVE LAMINATED GLASS

(75) Inventor: James Allen Chick, Amery, WI (US)

(73) Assignee: Cardinal LG Company, Eden Prairie, MN (US)

( * ) Notice: Subject to any disclaimer, the term of this patent is extended or adjusted under 35 U.S.C. 154(b) by 154 days.

This patent is subject to a terminal disclaimer.

(21) Appl. No.: 10/393,197

(22) Filed: Mar. 20, 2003

(65) Prior Publication Data

US 2004/0182493 A1 Sep. 23, 2004

(51) Int. Cl.
*B32B 17/10* (2006.01)
*B32B 31/26* (2006.01)
*B32B 31/28* (2006.01)
*C03C 27/12* (2006.01)

(52) U.S. Cl. ............... 156/499; 156/538; 156/555; 156/580; 156/582

(58) Field of Classification Search ............... 156/99, 156/103, 106, 272.2, 273.9, 274.2, 275.7, 156/312, 350, 358–359, 367–368, 379.6, 156/380.9, 381, 499, 538–539, 543, 555, 156/580, 582; B32B 17/10, 31/26, 31/28; C03C 27/12
See application file for complete search history.

(56) References Cited

U.S. PATENT DOCUMENTS

| | | | |
|---|---|---|---|
| 2,106,766 A | 12/1934 | Sherts, et al. | |
| 2,163,648 A | 6/1939 | Watkins et al. | |
| 2,182,358 A | 12/1939 | Sherts, et al. | |
| 2,235,958 A | * 3/1941 | Boicey ........................ 156/103 |
| 2,673,168 A | 3/1954 | Pascoe et al. | |
| 2,685,548 A | 8/1954 | Drozdowski | |
| 3,234,062 A | 2/1966 | Morris | |
| 3,952,135 A | 4/1976 | Priddle et al. | |
| 4,030,961 A | 6/1977 | Straeten et al. | |
| 4,103,070 A | 7/1978 | Ammons | |
| 4,174,241 A | 11/1979 | Rockar et al. | |
| 4,204,029 A | 5/1980 | Batchelor et al. | |
| 4,309,484 A | 1/1982 | Ohmae et al. | |
| 4,327,634 A | 5/1982 | Colmon et al. | |
| 4,397,976 A | 8/1983 | Mori et al. | |
| 4,668,574 A | 5/1987 | Bolton et al. | |
| 4,675,237 A | 6/1987 | Bravet et al. | |
| 4,824,722 A | 4/1989 | Jarrett | |
| 4,828,784 A | 5/1989 | Hahn ........................ 264/316 |
| 4,906,703 A | 3/1990 | Bolton et al. | |
| 4,988,398 A | 1/1991 | Pereman et al. | |
| 4,999,071 A | 3/1991 | Nakamura et al. | |
| 5,002,820 A | 3/1991 | Bolton et al. | |
| 5,300,184 A | 4/1994 | Masunaga | |
| 5,340,654 A | 8/1994 | Ueda et al. | |
| 5,415,909 A | 5/1995 | Shohi et al. | |
| 5,496,640 A | 3/1996 | Bolton et al. | |
| 5,536,347 A | 7/1996 | Moran | |

(Continued)

FOREIGN PATENT DOCUMENTS

EP  0707950  3/2000

(Continued)

*Primary Examiner*—Jessica Rossi
(74) *Attorney, Agent, or Firm*—Fredrikson & Byron, P.A.

(57) ABSTRACT

The invention provides a non-autoclave method and apparatus for producing laminated glass. The method and apparatus provide a non-autoclave laminated glass process that is continuous and thus eliminates the batch processing of known autoclave processes. In addition, the method and equipment do not require vacuum processes, involving complicated vacuum bags, vacuum rings, or the like.

32 Claims, 7 Drawing Sheets

U.S. PATENT DOCUMENTS

| | | |
|---|---|---|
| 5,698,053 A | 12/1997 | Carroll et al. |
| 5,759,698 A | 6/1998 | Tanuma et al. |
| 5,763,062 A | 6/1998 | Smith et al. |
| 5,895,721 A | 4/1999 | Naoumenko et al. |
| 5,912,082 A | 6/1999 | Park et al. |
| 6,096,148 A | 8/2000 | Kingma |
| 6,127,032 A | 10/2000 | Kelch et al. |
| 6,237,306 B1 | 5/2001 | Dlubak |
| 6,329,061 B1 | 12/2001 | Kondo |
| 6,336,490 B1 | 1/2002 | Balduin et al. ............ 156/382 |
| 6,353,042 B1 | 3/2002 | Hanoka et al. |
| 6,361,101 B1 | 3/2002 | Yoshizawa |
| 6,387,516 B1 | 5/2002 | Shichiri et al. |
| 6,413,618 B1 | 7/2002 | Parker et al. |
| 6,419,734 B1 | 7/2002 | Naoumenko et al. |
| 6,506,487 B1 | 1/2003 | Nagai |
| 2003/0148114 A1 | 8/2003 | Bourcier, et al. |

FOREIGN PATENT DOCUMENTS

| | | |
|---|---|---|
| WO | WO 88/03517 | 5/1988 |
| WO | WO 91/01880 | 2/1991 |
| WO | WO 98/40324 | 9/1998 |

* cited by examiner

NON-AUTOCLAVE LAMINATED GLASS

FIELD OF THE INVENTION

The present invention relates generally to laminated glass and methods and equipment for producing such glass. More particularly, this invention relates to non-autoclave laminated glass and methods and equipment for producing such glass.

BACKGROUND OF THE INVENTION

Laminated glass is widely utilized in industry, most notably for motor vehicle windshields and other safety glass. Generally, laminated glass comprises two sheet-like substrates (e.g., glass sheets) and an interlayer (e.g., a tear-resistant plastic) positioned between the two substrates. An advantage of using laminated glass is that, when impacted by an object, the laminated glass retains its overall structural integrity and reduces the occurrence of flying glass resulting from glass breakage. Using laminated glass for motor vehicle windows, for example, helps ensure the safety of drivers and passengers in the event of accidents. Similarly, using laminated glass in other safety glass applications (hurricane glass, blast-resistant glass, etc.) helps ensure the safety of bystanders.

Generally, the manufacture of laminated glass is known to involve two operations: (1) an assembly operation, and (2) an autoclave operation. In the assembly operation, the interlayer is positioned between two glass substrates to form a sandwich, which is then heated (commonly to a temperature of between about 120° F. and about 170° F.) and roller pressed to initiate removal of air trapped between the interlayer and to initiate adhesion of the interlayer to the glass. In the autoclave operation, the sandwich is exposed to an elevated temperature (commonly between about 275° F. and about 300° F.) and an elevated atmospheric pressure (commonly between about 150 psig and about 190 psig) until there is complete adhesion of the interlayer to the glass and complete dissolution of air trapped within the interlayer. It is not uncommon for the autoclave operation to last two hours or four hours per treatment.

One of the major drawbacks of manufacturing laminated glass with an autoclave method is the long autoclave operation time. Conventional autoclave methods are batch processes. As a result, they are limited in terms of throughput by the batch processing requirements of the autoclave. As noted above, it commonly takes about two or four hours, depending on batch size, for a batch of laminates to be autoclaved. It would be desirable to provide a continuous (i.e., non-batch) method for producing laminated glass.

A related drawback of producing autoclaved laminated glass is that defects in the laminated glass sometimes do not appear until after the laminated glass has been autoclaved. For example, manufacturers commonly have to wait about two hours, and sometimes about four hours, for each batch of autoclaved laminated glass before detecting any unexpected defects that may appear. Thus, it would be desirable to provide a continuous non-autoclave process.

Non-autoclave laminated glass is disclosed in U.S. Pat. No. 5,536,347 (Moran), and U.S. Pat. No. 3,234,062 (Morris), the entire teachings of each of which are incorporated herein by reference. While these references disclose non-autoclave laminated glass, both have significant limitations. For example, both references disclose vacuum processes wherein complicated vacuum bags, vacuum rings, or the like are used. It would be desirable to provide a non-autoclave laminated glass method that can be preferred under ambient atmospheric conditions and that does not require vacuum bags, vacuum rings, or any other complicated devices.

SUMMARY OF THE INVENTION

The invention provides a non-autoclave method and apparatus for producing laminated glass. The method and apparatus provide a non-autoclave laminated glass process that is continuous and thus eliminates the batch processing of known autoclave processes. In addition, the method and equipment do not require vacuum processes, involving complicated vacuum bags, vacuum rings, or the like.

Certain embodiments of the invention provide a method of producing non-autoclave laminated glass. A laminated glass panel is provided comprising a desired interlayer sandwiched between at least two glass sheets. A production line is provided comprising a plurality of ovens each followed by at least one pair of confronting press members, wherein a substrate support defines a path of substrate travel extending along the production line. The laminated glass panel is conveyed along the path of substrate travel and the ovens and the press members are operated, wherein the operation of the ovens delivers heat to the laminated glass panel and the operation of the press members applies pressure to the laminated glass panel. The operation of the ovens also delivers enough heat to the laminated glass panel to bring it to a temperature of at least about 255 degrees Fahrenheit in a single pass along the path of substrate travel.

Also, certain embodiments of the invention provide a production line for producing non-autoclave laminated glass. The production line comprises at least three ovens each followed by at least one pair of confronting press members between which laminated glass panels can be positioned during pressing operations. A substrate support defines a path of substrate travel extending through the ovens and between each pair of confronting press members. The ovens are adapted for heating a laminated glass panel to a temperature of at least about 255 degrees Fahrenheit in a single pass along the path of substrate travel.

Further, certain embodiments of the invention provide a method of producing non-autoclave laminated glass. A laminated glass panel is provided comprising an ionoplast interlayer sandwiched between at least two glass sheets. A production line is provided comprising a plurality of ovens each followed by at least one pair of confronting press members, wherein a substrate support defines a path of substrate travel extending along the production line. The laminated glass panel is conveyed along the path of substrate travel and the ovens and the press members are operated, wherein the operation of the ovens delivers heat to the laminated glass panel and the operation of the press members applies pressure to the laminated glass panel. The operation of the ovens also delivers enough heat to the laminated glass panel to bring it to a temperature of at least about 255 degrees Fahrenheit in a single pass along the path of substrate travel.

DETAILED DESCRIPTION OF PREFERRED EMBODIMENTS

Figure 1:
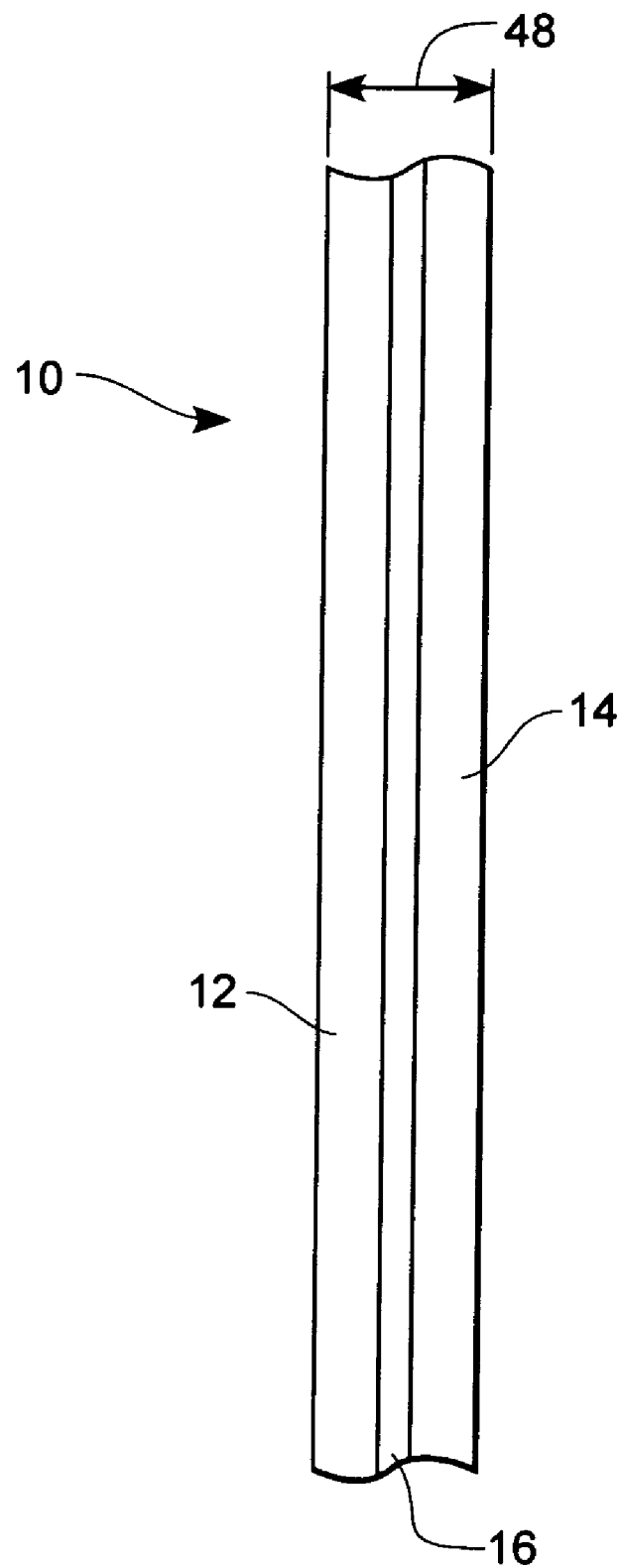
FIG. 1 is a side view of a laminated glass panel.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The invention provides non-autoclave methods and production lines for producing laminated glass. In the present methods, there is provided a laminated glass panel. The panel comprises a desired interlayer sandwiched between two sheet-like substrates. Typically, the substrates are glass sheets. However, plastic and other types of substrates can also be used. Thus, although the term "laminated glass panel" is used herein, the sheet-like substrates in such a panel can be formed of materials other than glass. FIG. 1 schematically illustrates the layered construction of such a laminated glass panel 10. The panel 10 includes a first sheet-like substrate 12 bonded to a second sheet-like substrate 14 by an intermediate tear-resistant plastic film (or "interlayer") 16. In certain preferred embodiments, before the laminate is conveyed through the production line, the first sheet-like substrate has a thickness of between about 0.063 inch and about 0.224 inch, the second sheet-like substrate has a thickness of between about 0.063 inch and about 0.224 inch, and the intermediate tear-resistant plastic film has a thickness of between about 0.015 inch and about 0.180 inch. In certain particularly preferred embodiments, the interlayer 16 is a film of ionoplast plastic, as described below. Other preferred embodiments utilize an interlayer of polyvinylbutyral (PVB). In certain general embodiments of the invention, any desired interlayer material 16 can be used. Other useful materials for the interlayer 16 include urethane, silicone, etc.

As noted above, an ionoplast material is used for the interlayer 16 in certain particularly preferred embodiments. Ionoplast material is available commercially from Dupont (Wilmington, Del., U.S.A.), under the trade name Sentry Glas® Plus. The inventors have discovered that using an ionoplast material as the interlayer 16 in the present non-autoclave glass provides a surprising degree of flexibility in terms of the process parameters that can be used to produce laminates with optimal safety and appearance properties. For example, using an ionoplast interlayer provides exceptional flexibility to vary the laminate speed, the oven temperatures, the length of the production line, and the foot path dimensions. Thus, embodiments of the invention wherein an ionoplast material is used for the interlayer 16 are particularly advantageous.

Figure 2:
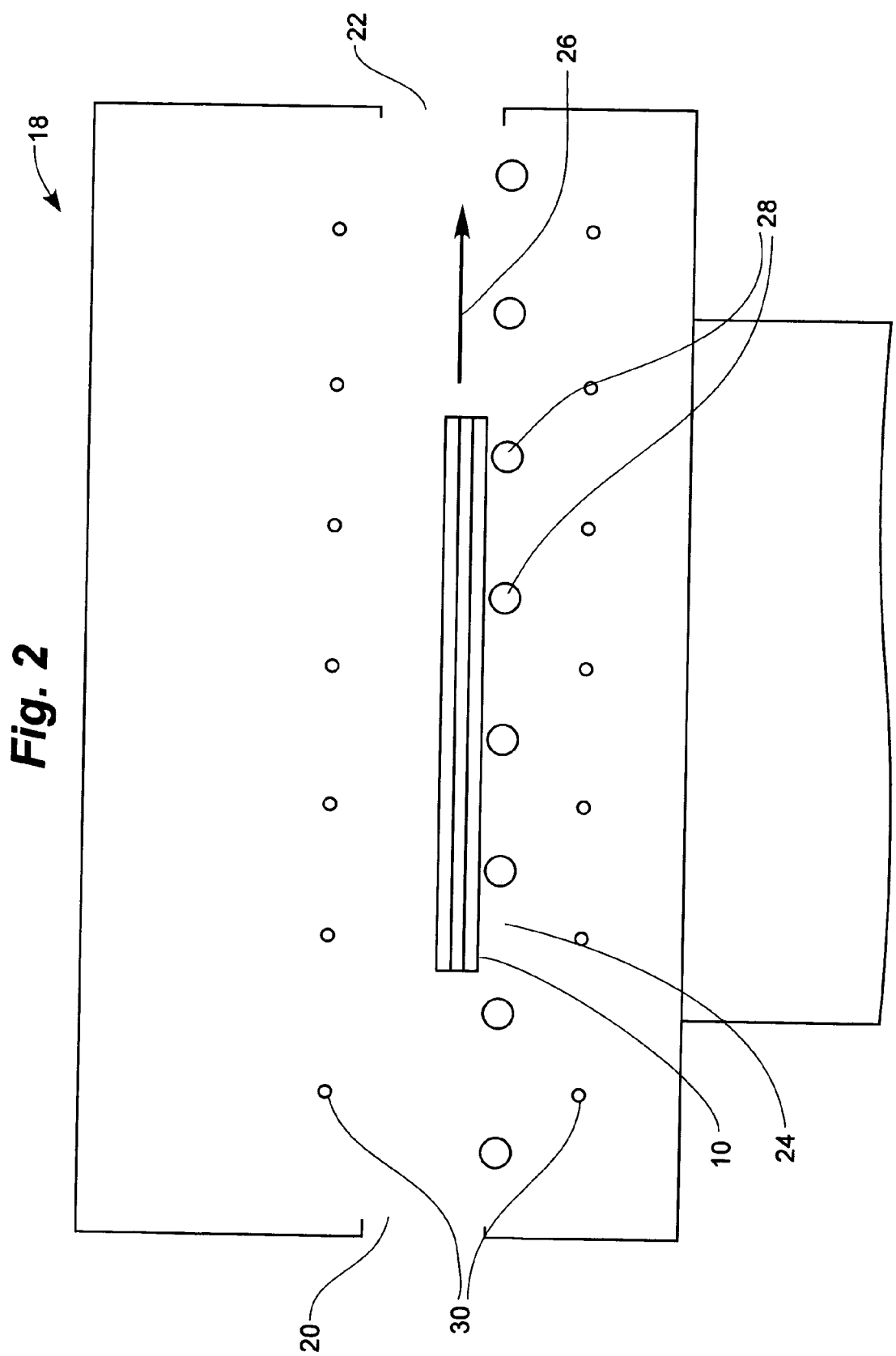
FIG. 2 is a schematic, cross-sectional side view of an oven in accordance with certain embodiments of the invention.

The production line used in the present invention preferably comprises a plurality of ovens. In certain preferred embodiments, the production line includes at least three ovens. In certain particularly preferred embodiments, the production line includes at least six ovens (e.g., between six and nine ovens). The ovens preferably are commercially available pre-heat and tacking ovens. FIG. 2 is a cross-sectional side view of such an oven 18 in accordance with certain embodiments of the invention. As shown, the oven 18 has an inlet opening 20 and an outlet opening 22. A substrate support 24 defines a path of substrate travel 26, a portion of which extends from the inlet opening 20, through the oven 18, and to the outlet opening 22. Preferably, the substrate support 24 comprises a plurality of spaced-apart transport rollers 28 that are adapted to convey the laminated glass panel 10 along the path of substrate travel 26. Preferably, at least some of the transport rollers 28 in each oven 18 are operatively coupled to one or more motors (not shown), such that the motorized rollers are adapted to convey the laminated glass panel 10 along the path of substrate travel 26. In certain particularly preferred embodiments, at least some of the motors are variable speed motors, which allow the laminated glass panel 10 to be conveyed through different ovens at different rates. Preferably, the thus-motorized rollers are adapted to convey the laminated glass panel 10 at an overall rate greater than about 15 feet per minute, and perhaps more preferably greater than about 20 feet per minute. In embodiments wherein the substrate support 24 comprises transport rollers 28, the production method typically comprises conveying (and thus transporting) the laminated glass panel along the rollers 28.

Preferably, the ovens 18 are radiant ovens each having at least one heating element 30. In the embodiment of FIG. 2, the oven includes a plurality of spaced-apart heating elements 30, which are preferably positioned below and/or above the path of substrate travel 26. Various types of heating elements can be used such as rod and coil, suspended coil, spiral-wound, or tubular types. In certain preferred embodiments, the heating elements 30 are quartz tube heating elements. For example, the heating elements 30 can be tubular quartz medium range infrared heaters operating over a wavelength range of between about 2.5 microns and about 2.7 microns with a wattage density of about 45 watts per linear inch. Preferably, the heating elements 30 are configured in a high intensity heating pattern, although the heating elements 30 can be configured in a medium intensity heating pattern, and even in a low intensity heating pattern if desirable in some embodiments. Typically, the heating elements 30 are mounted to, and extend from, walls of the radiant oven 18 in which they are located. In certain particularly preferred embodiments, the ovens 18 have independent temperature controls such that different ovens 18 can be operated at different temperatures. Useful ovens 18 of the desired nature are commercially available from Casso Solar (Pomona, N.Y., U.S.A.).

Figure 3:
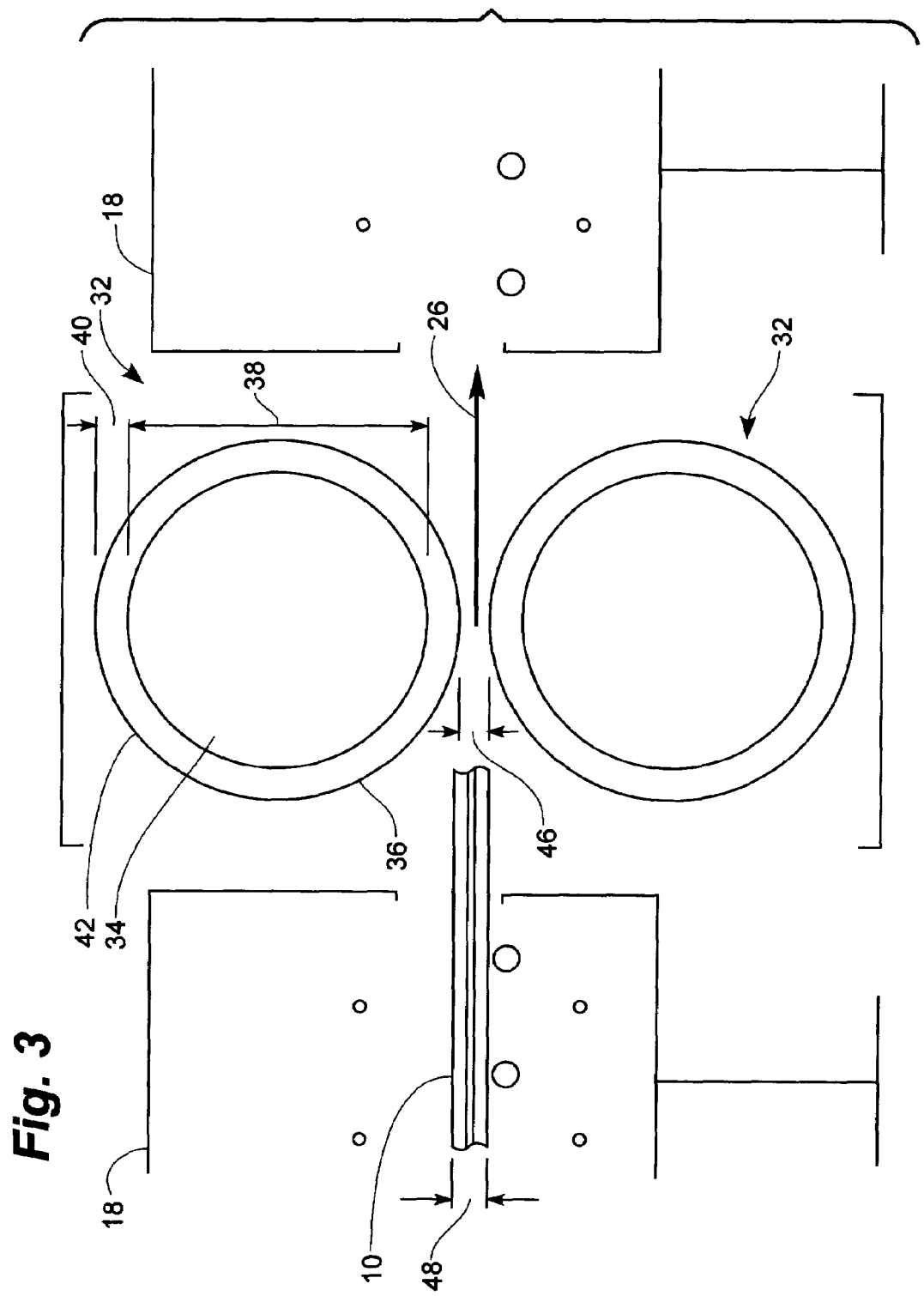
FIG. 3 is a schematic, cross-sectional side view of a pair of confronting press members in accordance with certain embodiments of the invention.

Thus, the production line preferably includes a plurality of ovens 18. Each oven 18 is preferably followed by at least one pair of confronting press members between which the laminated glass panel 10 can be positioned (e.g., conveyed) during a pressing operation. The confronting press members can be confronting nip rollers (or "press rolls"), platen presses, or other press members that are adapted to deliver energy (e.g., by applying pressure) to the laminated glass panels during a pressing operation. Preferably, the confronting press members are nip rollers. FIG. 3 exemplifies a pair of confronting press members 32 of this nature. By using nip rollers 32 in the production line, the laminated glass panel 10 can be moved continuously along the path of substrate travel 26, without having to interrupt the conveyance of the panel 10 to perform pressing operations. Thus, in certain methods of the invention, the laminated glass panel 10 is conveyed on a continuous, uninterrupted basis through each of the ovens 18 and between each pair of confronting nip rollers 32. Thus, the path of substrate travel 26 preferably extends through each oven 18 and between each pair of confronting press members 32.

In embodiments wherein the press members comprise nip rollers, each roller 32 typically comprises a rigid cylinder 34 (e.g. having walls of steel) with a relatively soft roll cover 36, as is perhaps best appreciated with reference to FIG. 3. The diameter 38 of the rigid cylinder 34 can be varied as desired. In certain embodiments, the diameter 38 is preferably at least about 12 inches, perhaps more preferably at least about 14 inches, and perhaps optimally at least about 16 inches. The radial thickness 40 of the roll cover 36 can also be varied as desired. In certain embodiments, the radial thickness 40 is preferably at least about 1.5 inches, perhaps more preferably at least about 1.75 inches, and perhaps optimally at least about 2.0 inches. In certain particularly preferred embodiments, the roll cover is formed of material having a durometer of about 60, although this is by no means required for all embodiments of the invention. In certain embodiments, the roll cover 36 comprises rubber (perhaps optimally having the described durometer), although other materials can be used (e.g., plastic or the like). In certain embodiments, the roll cover 36 comprises EPDM (ethylene propylene diene monomer), a durable rubber that exhibits high tensile strength and excellent resistance to punctures, UV radiation, weathering and microbial attack. EPDM is also a highly flexible material having a low co-efficient of thermal expansion and contraction, which enables the material to be used effectively as an outer covering 36 for nip rollers 32. The outer surface 42 of the roll cover 36 is patterned similar to the tread of an automobile tire, having a plurality of intersecting grooves cut across its outer surface. The outer surface 42 can comprise a variety of different tread patterns. In certain embodiments of the invention, the tread pattern 44 (shown in FIG. 4) comprises a grid having a pair of groove sets, with each groove set comprising a plurality of channels that are oriented parallel to each other and that are equally spaced across the roll cover 36. Further, the groove sets are preferably positioned over each other (e.g., so as to intersect) such that their combination forms a plurality of squares or diamonds (e.g., having grooves therebetween) defining the outer surface 42 of the roll cover 36.

Figure 4:
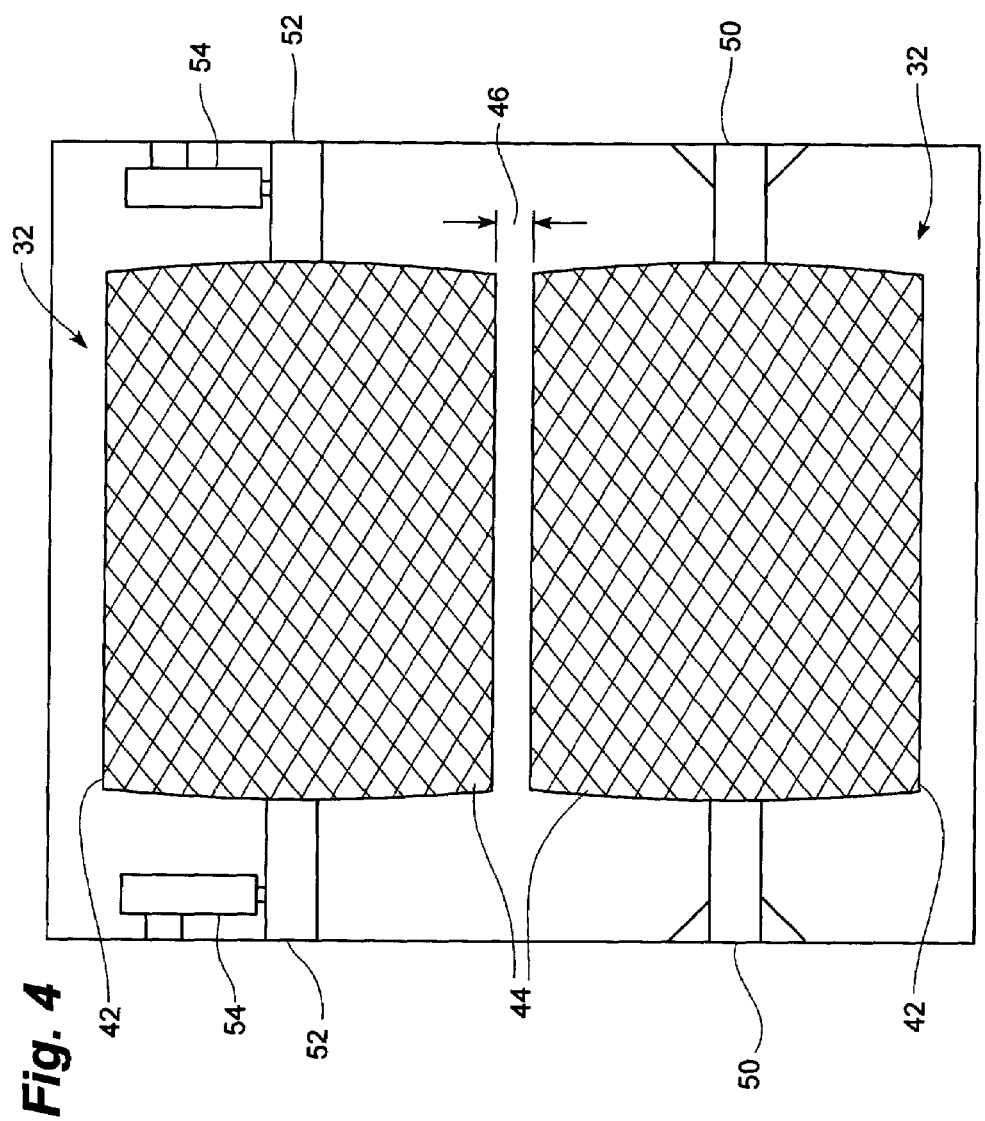
FIG. 4 is a schematic, front view of a pair of confronting press members in accordance with certain embodiments of the invention.

In the embodiments of FIGS. 3 and 4, each pair of confronting nip rollers 32 is mounted to provide a desired separation distance 46 (i.e., a gap exists between the confronting surfaces of the nip rollers 32). The separation distance 46 is defined as the distance between the two confronting surfaces (i.e., the vertical dimension of the gap between the rollers of each confronting pair, when no laminated glass panel is between the rollers). Typically, each pair of confronting nip rollers 32 has a separation distance 46 that is smaller than the thickness 48 of the laminated glass panel 10. Thus, when the laminated glass panel 10 is conveyed between the nip rollers 32, energy is delivered into the panel 10 to dissolve air trapped between the interlayer 16 and the substrates 12 and 14 and to enable the interlayer 16 to become further adhered to the substrates 12 and 14. In preferred embodiments, the separation distance 46 between the rollers 32 is smaller than the thickness of the laminated glass panel 10 by between about 0.05 inch and about 0.2 inch.

FIG. 4 is a front view of a pair of confronting nip rollers 32 wherein corresponding axles 50, 52 and air cylinders 54 are exemplified. As illustrated, each nip roller 32 has an axle 50 or 52 about which each corresponding roller 32 is rotatable. Preferably, the upper nip rollers 32 are each operatively coupled to at least one air cylinder 54 that is operated to apply downward pressure to the corresponding upper nip roller 32 during press operations. In so doing, each air cylinder 52 is utilized via the nip rollers 32 to apply pressure to (and thus to deliver increased energy into) the laminated glass panel. Commonly, one roller of each confronting pair has its axle fixed (such that this roller is not movable vertically), while the other roller is movable vertically. For example, the movable roller may have its axle held by elastic members operatively coupled either from above and/or below the roller. The elastic members are either extended, i.e., if located above, or compressed, i.e., if located below, such that the corresponding roller is mounted an initial vertical distance (i.e., the separation distance 46) away from immediately adjacent roller. Preferably, the movable roller has at least one air cylinder operatively coupled to its axle. In the embodiment of FIG. 4, the axle 50 of the lower nip roller is fixed and the axle 52 of the upper nip roller is operatively coupled to a pair of air cylinders 54. One air cylinder 54 is located on each end of the axle 52 of the upper nip roller. By applying air pressure evenly on both ends of the axle 52 via the air cylinders 54, the upper roller applies an even amount of pressure across the laminated glass panel, such that roller cant is prevented.

The air cylinders 54 are preferably 6 inch or 8 inch air cylinders. However, it is contemplated that cylinders of smaller size will be used in some embodiments. The air cylinders 54 utilized in certain embodiments of the present invention are believed to be larger than these used in conventional laminated glass production methods. Preferably, the air cylinders 54 are operated such that the pressure applied by the nip rollers on the surface of a laminated glass panel during a pressing operation is between about 60 pounds per linear inch and about 120 pounds per linear inch, and perhaps optimally between about 80 pounds per linear inch and about 85 pounds per linear inch.

Figure 5:
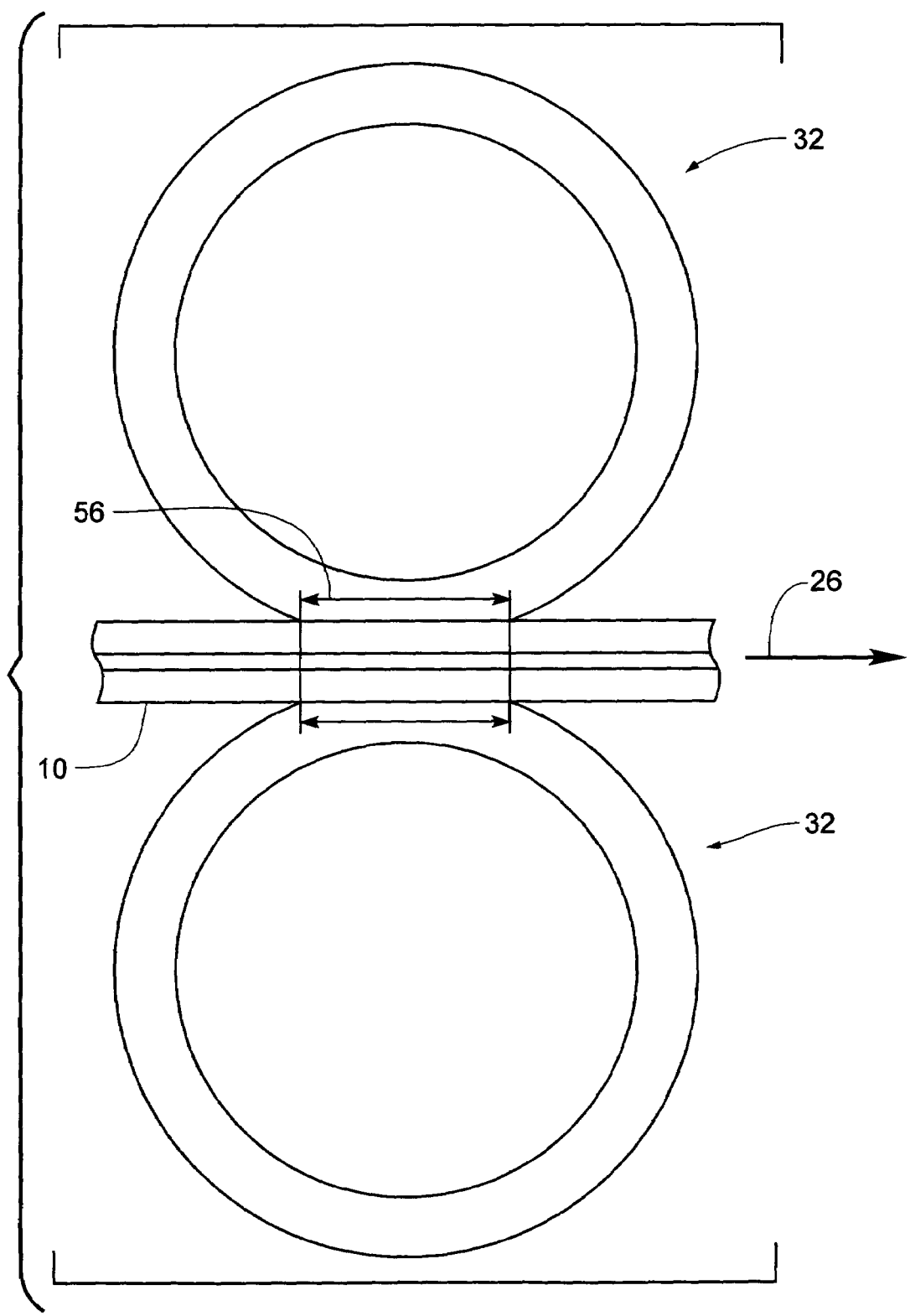
FIG. 5 is a schematic, cross-sectional side view of a pair of confronting press members in accordance with certain embodiments of the invention.

FIG. 5 is a schematic cross-sectional side view of a pair of confronting press members 32 during a pressing operation on a laminated glass panel 10. The invention facilitates conveying laminated glass panels 10 along the path of substrate travel 26 at an exceptionally high speed, as compared to line speeds on conventional laminated glass production lines. To assure enough energy is delivered into the laminates during their conveyance along the line, certain preferred embodiments of the invention provide nip rollers 32 that each provide a particularly large foot path 56. As shown, the foot path 56 is the surface distance along the laminate 10 (i.e., measured parallel to the path of substrate travel 26) that is in direct physical contact with a nip roller 32 at a given moment in time. In certain embodiments of the invention, the foot path 56 during a pressing operation is at least about 0.5 inch, perhaps more preferably at least about 1 inch, and perhaps optimally at least about 2 inches. Useful nip rollers 32 of the desired nature are commercially available from Champion Roller (Rock Hill, S.C., U.S.A.).

In one particular embodiment of the invention, the following arrangement is used for each pair of confronting nip rollers: steel cylinders each having a diameter of about 16 inches and roll covers (comprising EPDM rubber having a durometer of about 60 and the described tread pattern) each having a radial thickness of about 2.0 inches, wherein each pair of confronting nip rollers is mounted to provide a separation distance of about 0.1 inch, with the laminated glass panel having a thickness of about 0.3 inch.

Thus, the production line preferably includes a plurality of ovens each followed by at least one pair of confronting press members. The term oven is used herein to refer to a heating zone through which a laminated glass panel is conveyed on an uninterrupted basis before and/or after being acted upon by confronting press members. If so desired, one or more of the ovens/heating zones can be disposed within a common housing.

As noted above, the path of substrate travel extends through the ovens and between each pair of confronting press members. The ovens are preferably adapted for heating a laminated glass panel to a temperature of at least about 255 degrees Farenheit in a single pass along the path of substrate travel. In contrast, in conventional autoclave methods, the laminated glass panels are brought to a temperature of about 120° F.–170° F. when conveyed through the preheat tacking oven or ovens.

The path of substrate travel preferably has a length of at least about 40 feet, and perhaps more preferably at least about 50 feet. In certain particularly preferred embodiments, the length of the path of substrate travel is between about 55 feet and about 95 feet. Preferably, the laminated glass panels are transported (e.g., conveyed) along substantially the entire length of the path of substrate travel (preferably without stopping the laminated glass panels along the way). The length of the present production line is much greater than the length of laminated glass production lines used in conventional autoclave processes. This increased line length (especially when provided in combination with increased foot path and/or increased air cylinder pressure) enables the laminated glass panels to be conveyed much more rapidly than in conventional laminated glass production methods.

Figure 6:
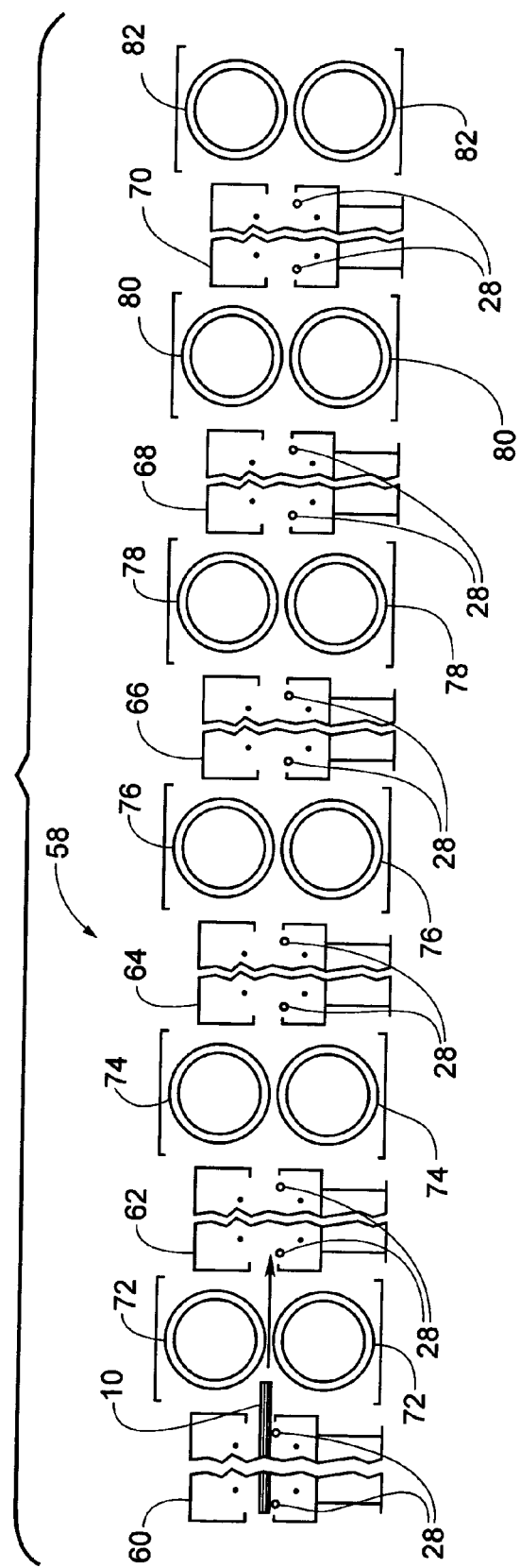
FIG. 6 is a partially broken away, schematic, cross-sectional side view of a production line in accordance with certain embodiments of the invention.

As noted above, the production line preferably includes at least three ovens, perhaps more preferably at least six ovens, and perhaps optimally between six and nine ovens. In conventional autoclave methods, a production line having one or two ovens is used, whereafter the laminated glass panels are treated in an autoclave to complete their production. FIG. 6 is a schematic cross-sectional side view of a production line 58 in accordance with certain embodiments of the present invention, wherein at least six ovens are provided. Here, the production line 58 may include only the illustrated six ovens, or additional ovens (e.g., one to three additional ovens) can be provided. In certain particularly preferred embodiments, the production line includes a first oven 60 having a length of about 20 feet (i.e., bounding a portion of the path of substrate travel about 20 feet in length), a second oven 62 having a length of about 10 feet, a third oven 64 having a length of about 10 feet, a fourth oven 66 having a length of about 10 feet, a fifth oven 68 having a length of about 10 feet, and a sixth oven 70 having a length of about 10 feet. In certain preferred embodiments, the ovens have independent temperature controls that allow different ovens to be operated at different temperatures. In these embodiments, the ovens can be set to different interior temperatures, such that the laminated glass panel 10 can be exposed to different levels of heating when conveyed through different ovens. Accordingly, in certain methods of the invention, the ovens are operated at different temperatures. Conjointly, the transport rollers 28 in the ovens preferably are adapted to convey laminated glass panels 10 through different ovens at different speeds, as well as through different pairs of confronting press members at different speeds. For example, at least some of the transport rollers 28 preferably are operatively connected to variable speed motors. Thus, in certain methods of the invention, the laminated glass panel 10 is conveyed through different ovens at different rates. Similarly, when the confronting press members are nip rollers, these rollers are preferably adapted for running at different rotational speeds. The ability to both vary the temperatures in each oven as well as vary the speeds at which the laminated glass panel is conveyed through each oven and each pair of confronting press members is critical to the process. Only by warming the laminated glass panel within the precise ranges of temperatures and by applying the precise amount of pressure over a given amount of time can air existing within the laminated glass panel be completely evacuated.

The non-autoclave methods of the invention include providing a laminated glass panel comprising a desired interlayer sandwiched between at least two sheet-like substrates. (As noted above, the laminated glass panel is provided with an ionoplast layer in certain particularly advantageous embodiments.) The present methods include providing a production line comprising a plurality of ovens each followed by at least one pair of confronting press members, wherein a substrate support defining a path of substrate travel extends along the production line. The laminated glass panel is conveyed along the path of substrate travel (and is thus transported through the ovens and between each pair of confronting press members) while the ovens and press members are operated. Operating the ovens delivers heat to the laminated glass panel and operating the press members applies pressure to the laminated glass panel. The laminated glass panel is conveyed along the path of substrate travel while the ovens are operated such that the laminated glass panel is brought to a temperature of at least about 255 degrees Fahrenheit in a single pass along the path of substrate travel. Preferably, the laminated glass panel is heated to a temperature of between about 270° F. and about 300° F. during a single pass along the path of substrate travel.

The laminated glass panel can be conveyed along the path of substrate travel at surprisingly high rates in the present method. For example, the laminated glass panel is preferably conveyed at an overall rate greater than about 15 feet per minute, and perhaps preferably greater than about 20 feet per minute. As noted above, the laminated glass panel can be conveyed along the path of substrate travel by operating motorized transport rollers, in which case these motorized rollers preferably are operated (i.e., rotated) so as to convey the laminated glass panel at the described high rates.

As noted above, the production line in certain embodiments comprises at least three ovens (perhaps more preferably at least six ovens and perhaps optimally between six and nine ovens) each followed by at least one pair of confronting press members. In these embodiments, the production method involves conveying the laminated glass panel through each of the ovens and between each pair of confronting press members (i.e., between confronting surfaces of the rollers of each pair).

In certain particularly preferred methods, pressing operations are performed on the laminated glass panel by the confronting press members (e.g., nip rollers) when the panel is at particular temperatures. This is perhaps best appreciated with reference to FIG. 6. Preferably, a first pressing operation is performed upon the laminated glass panel 10 by a first pair of confronting press members 72 when the panel 10 is at a temperature of between about 110° F. and about 150° F., and perhaps more preferably between about 130° F. and about 140° F. A second pressing operation is desirably performed upon the laminated glass panel 10 by a second pair of confronting press members 74 when the panel 10 is at a temperature of between about 130° F. and about 180° F., and perhaps more preferably between about 150° F. and about 160° F. A third pressing operation is desirably performed on the laminated glass panel 10 by a third pair of confronting press members 76 when the panel 10 is at a temperature of between about 150° F. and about 220° F., and perhaps more preferably between about 180° F. and about 190° F. A fourth pressing operation is preferably performed on the laminated glass panel 10 by a fourth pair of confronting press members 78 when the panel 10 is at a temperature of between about 180° F. and about 250° F., and perhaps more preferably between about 210° F. and about 220° F. A fifth pressing operation is preferably performed on the laminated glass panel 10 by a fifth pair of confronting press members 80 when the panel 10 is at a temperature of between about 210° F. and about 280° F., and perhaps more preferably between about 240° F. and about 250° F. A sixth pressing operation is preferably performed on the laminated glass panel 10 by a sixth pair of confronting press members 82 when the panel 10 is at a temperature of between about 230° F. and about 300° F., and perhaps more preferably between about 260° F. and about 270° F. In these particularly preferred methods, other pressing operations can also be performed upon the laminated glass panel 10, if so desired. For example, it may be particularly advantageous to provide one, two, or three cool-down ovens (each optionally followed by a confronting pair of press members) following the described sixth pressing operation, wherein the temperature of the laminated glass panel 10 is gradually decreased as it is conveyed through such cool-down oven or ovens.

As noted above, the confronting press members can be nip rollers. Thus, certain methods of the invention involve conveying a laminated glass panel between confronting nip rollers while simultaneously pressing the laminated glass panel with the nip rollers. In certain preferred methods, the nip rollers are operated to provide a foot path on the laminated glass panel (during the pressing operation) of at least about 0.5 inch, perhaps more preferably at least about 1 inches, and perhaps optimally at least about 2 inches. In certain particularly preferred methods, in combination with using a particularly large foot path, the laminated glass panel is conveyed at a particularly high overall rate (e.g., at least about 15 feet per minute, and perhaps more preferably at least about 20 feet per minute).

During certain preferred pressing operations, the air cylinders are operated to apply pressure via the nip rollers to the laminated glass panel. These air cylinders are preferably operated such that the nip rollers apply to the laminated glass panel pressure of between about 60 pounds per linear inch and about 120 pounds per linear inch, and perhaps optimally between about 80 pounds per linear inch and about 85 pounds per linear inch. As described above, this pressure is greater than that applied in conventional laminated glass production methods.

In one particular embodiment of the invention, the following arrangement is used for a production line of the invention: six radiant ovens each oven provided with tubular quartz medium range infrared heating elements positioned above and below the path of substrate travel, each oven being followed by one pair of nip rollers having a diameter of 16 inches and a roll cover (comprising EPDM rubber having a durometer of about 60) having a radial thickness of about 2.0 inches, each upper nip roller being operatively coupled with a pair of air cylinders. The first oven of the production line is about 20 feet in length and has heating elements configured in a high intensity pattern such that the temperature of the laminated glass panel is brought to a temperature of about 130° F. upon reaching the end of this oven. A pressing operation is thus performed by the first pair of confronting nip rollers while the laminated glass panel is at a temperature of about 130° F. The second oven of the production line is about 10 feet in length and has heating elements configured in a high intensity pattern such that the temperature of the laminated glass panel is brought to a temperature of about 160° F. upon reaching the end of this oven. A pressing operation is thus performed by the second pair of confronting nip rollers while the laminated glass panel is at a temperature of about 160° F. The third oven of the production line is about 10 feet in length and has heating elements configured in a medium intensity pattern such that the temperature of the laminated glass panel is brought to a temperature of about 185° F. upon reaching the end of this oven. A pressing operation is thus performed by the third pair of confronting nip rollers while the laminated glass panel is at a temperature of about 185° F. The fourth oven of the production line is about 10 feet in length and has heating elements configured in a medium intensity pattern such that the temperature of the laminated glass panel is brought to a temperature of about 215° F. upon reaching the end of this oven. A pressing operation is thus performed by the fourth pair of confronting nip rollers while the laminated glass panel is at a temperature of about 215° F. The fifth oven of the production line is about 10 feet in length and has heating elements configured in a medium intensity pattern such that the temperature of the laminated glass panel is brought to a temperature of about 245° F. upon reaching the end of this oven. A pressing operation is thus performed by the fifth pair of confronting nip rollers while the laminated glass panel is at a temperature of about 245° F. The sixth oven of the production line is about 10 feet in length and has heating elements configured in a low intensity pattern such that the temperature of the laminated glass panel is brought to a temperature of about 270° F. upon reaching the end of this oven. A pressing operation is thus performed by the sixth pair of confronting nip rollers while the laminated glass panel is at a temperature of about 270° F. Each nip roller comprises a steel cylinder having diameter of about 16 inches and a roll cover (comprising EPDM rubber having a durometer of about 60) having a radial thickness of about 2.0 inches, wherein each pair of confronting nip rollers is mounted to provide a separation distance of about 0.1 inch. Each of the two air cylinders on each upper nip roller is an 8 inch air cylinder. These air cylinders are operated such that a pressure of about 85 pounds per linear inch is applied to the laminated glass panel during each pressing operation. The path of substrate travel, defined by a plurality of transport rollers, has a length of about 80 feet, and the transport rollers are operatively connected to variable speed motors such that the laminated glass panel is conveyed along the path of substrate travel at an overall rate about 20 feet per minute. In particular, the laminated glass panel is conveyed at varying speeds along the production line with the first, second, third, and fourth ovens being set at a first speed, while the fifth and sixth ovens being set at a second speed about 15% less than the first speed. The laminated glass panel comprises an ionoplast interlayer positioned between two glass sheets and has a thickness of about 0.3 inch. Under these conditions, there is achieved a foot path of about 2.0 inches when the laminated glass panel is conveyed between each pair of confronting press members.

Figure 7:
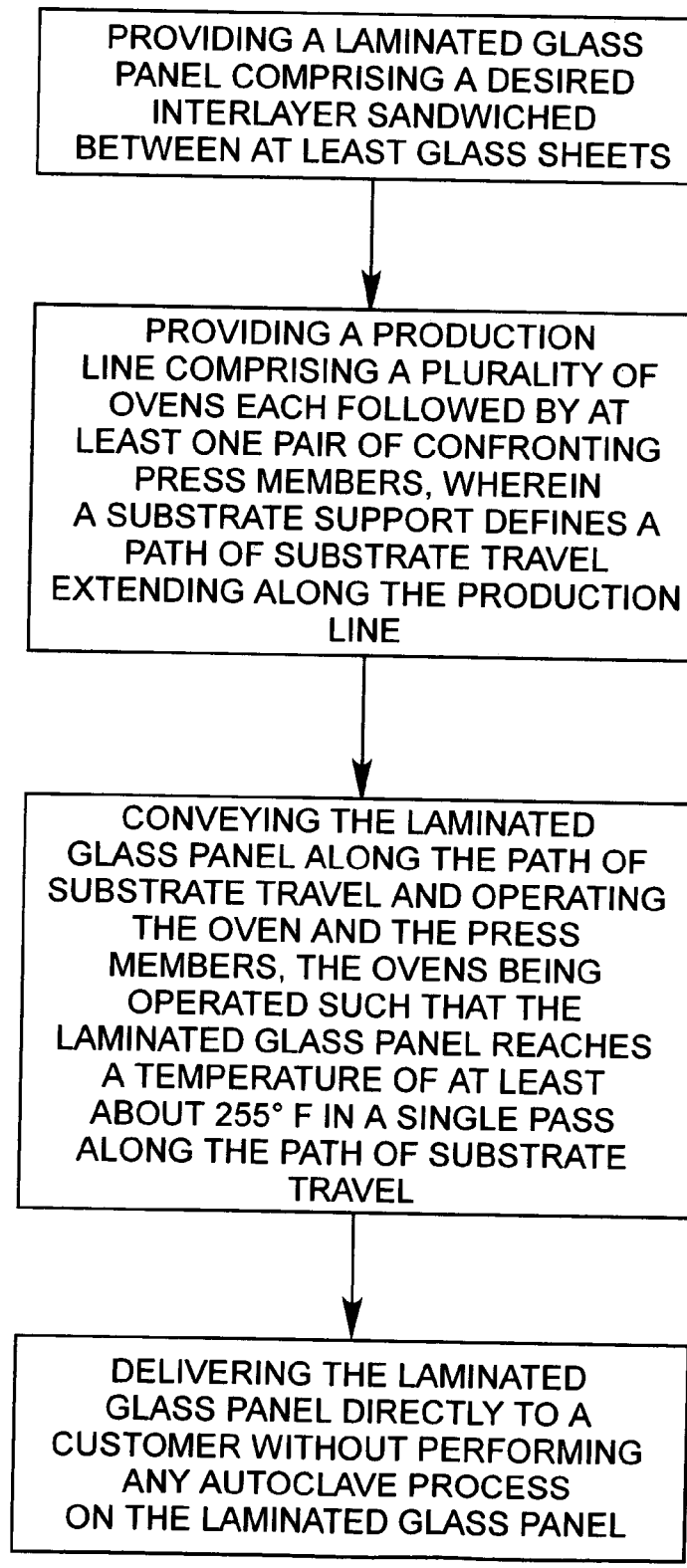
FIG. 7 is a flow chart exemplifying a method in accordance with certain embodiments of the invention.

It is to be understood that the present method is a non-autoclave production method. In this method, the laminated glass panel is preferably maintained at an ambient atmospheric pressure at all times during the production method. Thus, the laminated glass panel is not subjected to an elevated atmospheric pressure, as is characteristic of autoclave methods, nor is the laminated glass panel subjected to a vacuum, as is characteristic of the non-autoclave methods described above. FIG. 7 exemplifies certain methods of the invention wherein following removal of laminated glass panels from the production line (e.g., upon reaching the end of the path of substrate travel), the laminated glass panels are delivered to a customer without performing any autoclave process on the laminated glass panels. Embodiments of this nature are particularly preferred.

Currently, predominantly all (if not all) commercially available laminated glass is produced by an autoclave process. Skilled artisans may generally expect the non-autoclave laminated glass panels to be of inferior quality, since these panels are not treated under super-atmospheric pressure in an autoclave. Surprisingly, the inventors have discovered that the present non-autoclave methods yield laminated glass panels that are just as good, if not better, than laminated glass panels produced using an autoclave. Producing laminates with optimal safety and appearance properties involves producing laminates that meet, and typically exceed, industry standards. One such industry standard for laminated glass panels is ANSI Z97.1, in accordance with the American National Standards Institute. In conformance with ANSI Z97.1, two tests, a boil test and a bag drop test, are routinely used to test laminated glass produced using conventional autoclave processes. These tests are performed to ensure that laminated glass meets the appearance and safety (adhesion) standards of the industry. Generally, in order to satisfy the above-mentioned boil test, the panel must be free of air bubbles beyond 0.5 inch from any outer edge of the laminate after conducting the test. Generally, in order to satisfy the above-mentioned bag drop test, the panel must withstand a 100 pound bag dropped from a 48 inch height without creating a hole therein that a 3" sphere can pass through. Both in terms of appearance and safety, the laminated glass panels produced using the present invention exhibit test values that meet, and often exceed these acceptable industry standards adopted for these properties.

While preferred embodiments of the present invention have been described, it should be understood that a variety of changes, adaptations, and modifications can be made therein without departing from the spirit of the invention and the scope of the appended claims.

What is claimed is:

1. A production line for producing non-autoclave laminated glass, the production line comprising at least three ovens each followed by at least one pair of confronting press members between which laminated glass panels can be positioned during pressing operations, wherein a substrate support defines a heating path of substrate travel extending through the ovens and between each pair of confronting press members, each of the ovens having a length of at least 10 feet, the heating path of substrate travel having a length of at least about 40 feet, and wherein the production line is adapted for producing a laminated glass panel.

2. The production line of claim 1 wherein the ovens have independent temperature controls, such that different ovens can be operated at different temperatures.

3. The production line of claim 1 wherein the path of substrate travel has a length of between about 55 feet and about 95 feet.

4. The production line of claim 1 wherein the line includes between six and nine ovens each followed by at least one pair of confronting press members between which laminated glass panels can be positioned during pressing operations.

5. The production line of claim 1 wherein the substrate support comprises a plurality of spaced-apart transport rollers.

6. The production line of claim 5 wherein at least some of the transport rollers are operatively connected to variable speed motors, such that the laminated glass panel can be conveyed through different ovens at different rates.

7. The production line of claim 5 wherein at least some of the transport rollers are operatively connected to one or more motors, the thus-motorized rollers being adapted to convey the laminated glass panel along the path of substrate travel at an overall rate greater than about 15 feet per minute.

8. The production line of claim 7 wherein the thus-motorized rollers are adapted to convey the laminated glass panel along the path of substrate travel at an overall rate greater than about 20 feet per minute.

9. The production line of claim 1 wherein a first of the ovens has a length of about 20 feet.

10. The production line of claim 9 wherein a second of the ovens has a length of about ten feet.

11. The production line of claim 10 wherein a third of the ovens has a length of about ten feet.

12. The production line of claim 11 wherein a fourth of the ovens has a length of about ten feet.

13. The production line of claim 12 wherein a fifth of the ovens has a length of about ten feet.

14. The production line of claim 13 wherein a sixth of the ovens has a length of about ten feet.

15. The production line of claim 1 wherein the ovens are radiant ovens.

16. The production line of claim 15 wherein each oven comprises a plurality of spaced-apart heating elements, the heating elements being positioned below and/or above the path of substrate travel.

17. The production line of claim 16 wherein at least some of the heating elements are quartz tube heating elements.

18. The production line of claim 1 wherein the confronting press members are nip rollers.

19. The production line of claim 18 wherein the nip rollers are operatively coupled with air cylinders that are adapted for applying pressure via the nip rollers to the laminated glass panel during a pressing operation.

20. The production line of claim 18 wherein each pair of confronting nip rollers is mounted to provide a separation distance that is smaller than a thickness of the laminated glass panel.

21. The production line of claim 20 wherein the separation distance is smaller than the thickness of the desired laminated glass panel by between about 0.05 inch and about 0.2 inch.

22. The production line of claim 18 wherein each pair of confronting nip rollers is adapted to provide a foot path of at least about 0.5 inch on the laminated glass panel during a pressing operation.

23. The production line of claim 22 wherein each pair of confronting nip rollers is adapted to provide a foot path of at least about two inches on the laminated glass panel during a pressing operation.

24. A production line for producing non-autoclave laminated glass, the production line comprising at least six ovens each having at least one heating element, each oven followed by at least one pair of confronting press members wherein each pair of confronting press members are nip rollers, each of the ovens having a length of at least 10 feet, each of the pair of confronting press members having a diameter of at least 12 inches, and wherein a substrate support defines a path of substrate travel extending through each oven and between each pair of confronting press members.

25. The production line of claim 24 wherein the ovens have independent temperature controls, such that different ovens can be operated at different temperatures.

26. The production line of claim 24 wherein each pair of confronting nip rollers is adapted to provide a foot path of at least about 0.5 inch on a laminated glass panel during a pressing operation.

27. The production line of claim 1, wherein each of the pair of confronting press members has a diameter of at least 15 inches.

28. The production line of claim 24 wherein the substrate support comprises a plurality of spaced-apart transport rollers.

29. The production line of claim 28 wherein at least some of the transport rollers are operatively connected to variable speed motors, such that a laminated glass panel can be conveyed through different ovens at different rates.

30. The production line of claim 24 wherein the path of substrate travel has a length of at least about 40 feet.

31. The production line of claim 30 wherein the path of substrate travel has a length of at least about 50 feet.

32. The production line of claim 31 wherein the path of substrate travel has a length of between about 55 feet and about 95 feet.

* * * * *